(12) United States Patent  (10) Patent No.: US 8,233,154 B2
Feldman et al.  (45) Date of Patent: Jul. 31, 2012

(54) HIGH PRECISION CODE PLATES AND GEOPHONES

(75) Inventors: Martin Feldman, Baton Rouge, LA (US); Li Jiang, Auburn, AL (US)

(73) Assignee: Board of Supervisors of Louisiana State University And Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 12/097,835

(22) PCT Filed: Dec. 20, 2006

(86) PCT No.: PCT/US2006/048414
§ 371 (c)(1),
(2), (4) Date: Jun. 17, 2008

(87) PCT Pub. No.: WO2007/075675
PCT Pub. Date: Jul. 5, 2007

(65) Prior Publication Data
US 2008/0297807 A1  Dec. 4, 2008

Related U.S. Application Data

(60) Provisional application No. 60/753,140, filed on Dec. 22, 2005, provisional application No. 60/838,650, filed on Aug. 18, 2006.

(51) Int. Cl.
*G01B 11/02* (2006.01)
(52) U.S. Cl. ........................................................ 356/499
(58) Field of Classification Search ........... 356/499, 356/488, 494, 521
See application file for complete search history.

(56) References Cited

U.S. PATENT DOCUMENTS

| | | | |
|---|---|---|---|
| 3,996,463 A | 12/1976 | Jablonowski | 250/237 |
| 4,625,542 A * | 12/1986 | Nelson | 73/1.83 |
| 4,676,645 A | 6/1987 | Taniguchi et al. | 356/356 |
| 5,007,709 A * | 4/1991 | Iida et al. | 359/574 |
| 5,009,506 A * | 4/1991 | Spies | 356/499 |
| 5,249,032 A * | 9/1993 | Matsui et al. | 356/499 |
| 5,486,923 A | 1/1996 | Mitchell et al. | 356/356 |
| 6,325,172 B1 | 12/2001 | Langridge et al. | 181/122 |
| 6,445,456 B2 | 9/2002 | Speckbacher et al. | 356/499 |
| 6,771,377 B2 | 8/2004 | Jones et al. | 356/616 |
| 2004/0051881 A1 | 3/2004 | Holzapfel et al. | 356/616 |

OTHER PUBLICATIONS

U.S. Appl. No. 60/578,577, filed Jun. 2004, Feldman et al.
Jiang, L. et al., "Portable coordinate measuring tool," *J. Vac. Sci. Technol. B*, vol. 23, pp. 3056 ff (2005).
Jiang, L. et al. "Portable Coordinate Measuring Tool," presentation at the 49th International Conference on Electron, Ion and Photon Beam Technology and Nanofabrication, Orlando, FL (May 31-Jun. 1, 2005).

(Continued)

*Primary Examiner* — Tarifur Chowdhury
*Assistant Examiner* — Jonathon Cook
(74) *Attorney, Agent, or Firm* — John H. Runnels; Bonnie J. Davis

(57) ABSTRACT

An apparatus and method are disclosed for imaging a diffraction grating with a very high depth of focus, using a highly accurate code plate position measurement system. Positions may be measured to an accuracy of 1 nm or even smaller. The system may be used in fields such as manufacturing integrated circuits, and low- and very-low-frequency geophones, and other low- and very-low-frequency acoustic detectors.

23 Claims, 6 Drawing Sheets

OTHER PUBLICATIONS

Jiang, L. et al., "Technique for Separately Viewing Multiple Levels," *J. Vac. Sci. Technol. B*, vol. 22, pp. 3405 ff (2004).

Jiang, L. et al., "Technique for Separately Viewing Multiple Levels," presentation at the 48th International Conference on Electron, Ion and Photon Beam Technology and Nanofabrication, San Diego, CA (Jun. 1-4, 2004).

White, D.L. et al., "The interference fringe aligner," *J. Vac. Sci. & Technol. B*, vol. 6, pp. 1921-1924 (1988).

* cited by examiner

HIGH PRECISION CODE PLATES AND GEOPHONES

This is the United States national stage of international application PCT/US2006/048414, international filing date 20 Dec. 2006, which claims the benefit of the 22 Dec. 2005 filing date of U.S. provisional patent application 60/753,140, and of the 18 Aug. 2006 filing date of U.S. provisional patent application 60/838,650 under 35 U.S.C. §119(e)

TECHNICAL FIELD

This invention pertains to an apparatus and method for imaging a diffraction grating with a very high depth of focus, in a highly accurate code plate position measurement system. The invention has many uses, including for example uses in high precision geophones, hydrophones, other low-frequency or very-low-frequency acoustic measuring devices, and in integrated circuit fabrication.

Conventional code plates have been used to measure the position of mechanical stages in precision machining applications. Conventional code plates have had typical precisions of about 100 nm. The present invention allows measurements as precise as 1 nm, 0.1 nm, or even smaller, greatly extending the useful range of possible applications for these tools. As one example, tools used for manufacturing integrated circuits have typically used interferometers, because code plate systems have not been considered sufficiently accurate. The novel system makes code plates directly competitive with far more costly interferometer-based systems.

BACKGROUND ART

Conventional code plate systems direct light from a code plate directly onto detection gratings. Their resolution is limited by the relatively coarse rulings on the code plate and the detection gratings.

The accuracy of a code plate measuring system is determined by the absolute accuracy of the code plate itself, as well as by the precision with which the location along the code plate may be measured. Gratings are known in the art with a precision of 2 nm over dimensions up to 30 cm.

The smaller the period of the code plate and the gratings, the finer the measurements that may be made. The accuracy of determining the phase of a typical sinusoidal output measurement is typically on the order of one part per thousand, due to signal/noise and other limitations. Thus, the position of a 1 mm grating may be determined within about 1 µm, and the position of a 1 µm grating could, in principle, be determined within about 1 nm. However, such a fine pitch requires a correspondingly fine depth of focus in conventional systems, making them very difficult to use as a practical matter. In addition, previous code plate systems have generally been sensitive to factors such as variation in the distance between the code plate and the gratings, local variations in line width, and local variations in phase. Such factors have typically limited the precision of measurements made with conventional code plate systems to about 100 nm. Also, in existing code plate systems, a shadow of the code plate is typically cast upon the gratings. This method requires either a small gap between the code plate and the gratings, which is difficult to maintain as a practical matter, or it inherently degrades the resolution of the shadow cast on the gratings if a larger gap is used as a compromise measure.

Examples of prior systems using gratings for measuring position include U.S. Pat. No. 3,996,463, and published U.S. patent application 2004/0051881 A1.

Proximity Imaging. Proximity imaging uses a grating of clear and opaque lines, preferably of equal width (FIG. 1a) (a Ronchi grating). A collimated or quasi-collimated beam of light (shown schematically in FIG. 1b) casts a shadow of a first Ronchi grating onto a second Ronchi grating having the same period, and a photodetector registers the light passing through both gratings. As the first code plate moves from one position to another, the output of the photodetector passes through a series of minima and maxima. These extrema are counted to determine total movement of the code plate. To avoid possible ambiguity in the direction of motion, an optional second Ronchi grating and photodetector may be added, having a spatial phase of 90° relative to the first grating. Thus for one direction of motion a maximum in the signal from the first photodetector corresponds to a rising signal in the second photodetector, while for the other direction a maximum from the first detector corresponds to a falling signal in the second.

The sharpness of the shadow in proximity imaging is limited both by penumbral blurring and by diffraction. For a Ronchi grating of period P, the maximum permissible gap, g, is given by $$P/2 \approx \sqrt{\lambda g} \qquad (1)$$

where $\lambda$ is the wavelength of the light. For example, for visible light with a wavelength of 500 nm and a gap of 50 µm, the period P must be at least about 10 microns.

Talbot Imaging. Under coherent illumination, multiple images of the grating will form, spaced at intervals of $2P^2/\lambda$ (the so-called Talbot Effect). In principle, the Talbot Effect thus might allow one to use larger gaps. However, the depth of focus for each of the multiple images is still limited by equation (1). Additionally, coherent illumination is notoriously sensitive to artifacts arising from such things as dust or grating imperfections. These artifacts tend to distort Talbot images, leading to errors in the measured position of the grating. For an example of coherent distortion in a Talbot image of a grating under coherent HeNe laser light, see FIG. 2 of priority application 60/753,140 (not reproduced here).

Projection Imaging. An optical system, which may be referred to as a microscope, may be used to image a code plate onto the detection gratings, which are preferably also Ronchi gratings. Using a microscope for this purpose has the advantages of: (1) producing a large working distance to the code plate, equal to the working distance of the microscope objective, and (2) imaging onto enlarged gratings, which may be produced with relatively higher accuracy and precision than smaller gratings, and which may also be observed more readily. The depth of focus is given by $$\text{Depth of focus} = \frac{P^2}{2\lambda} \qquad (2)$$

or about 100 µm for the example conditions described above (viz., wavelength=500 nm, P=10 µm). Note from equation (2) that the depth of focus varies as the square of the period, dropping to just 1 µm for a 1 µm period grating for the same wavelength of light. This technique is not widely used, because the size of the optical system would be inconveniently large.

Spatial Filtering. Spatial filtering is sometimes used in various forms of projection imaging with coherent light. For example, zero order diffracted light from a grating may be blocked, as with a stop in a microscope objective. Spatial filtering can lead to a large depth of focus, comparable to the width of the illuminating beam. In addition, the apparent period of the grating is halved, so that, for example, the image of a 1 μm period grating appears to become that of a 0.5 μm period grating. Unfortunately, such images are subject to the same type of coherent illumination artifacts as are grating images. These artifacts may be reduced, while still preserving some of the advantages of spatial filtering, by illuminating the grating with slightly incoherent light, e.g., having a small range of wavelengths and angles. A slightly incoherent system provides a trade-off between depth of focus and distortion from coherent artifacts.

Oblique Imaging. A code plate may be illuminated by a collimated, coherent light beam at an angle such that the zero order beam passing through the code plate and the first order diffracted beam have an equal and opposite angle with respect to the direction normal to the plane of the grating, an angle known as the Littrow angle. Under these conditions, a first order beam is also diffracted back, towards the light source. See FIG. 2, which illustrates oblique illumination at the Littrow angle.

The principle of oblique illumination has been used in the integrated circuit industry to extend the resolution of patterns containing repeating features. Because the zero and first order beams are on opposite sides of the vertical, the numerical aperture (NA) of the imaging lens is effective doubled. For a grating that is under coherent illumination perpendicular to the plane of the grating, the smallest period that can be imaged by a lens with a given NA is $$P = \frac{\lambda}{\sin\theta} = \frac{\lambda}{NA} \quad (3)$$

But the smallest period that can be imaged by a lens illuminated at the Littrow angle is $$P = \frac{\lambda}{2NA} \quad (4)$$

Oblique illumination of gratings thus produces a high effective depth of focus. Oblique illumination allows one to image in air, vacuum, or other media gratings whose periods approach half the wavelength of the imaging light in the particular medium. Oblique illumination has the disadvantage that the contrast of the fringes is somewhat limited by the diffraction efficiency of the grating. Also, diffractive artifacts can tend to degrade the fringe pattern.

Other work by the inventors. Other work by the present inventors (alone or in collaboration with others) includes L. Jiang et at. "Portable Coordinate Measuring Tool," presentation at the 49th International Conference on Electron, Ion and Photon Beam Technology and Nanofabrication, Orlando, Fla. (May 31-Jun. 1, 2005); L. Jiang et al., "Technique for Separately Viewing Multiple Levels," presentation at the 48th International Conference on Electron, Ion and Photon Beam Technology and Nanofabrication, San Diego, Calif. (Jun. 1-4, 2004); L. Jiang et al., "Technique for Separately Viewing Multiple Levels," *J. Vac. Sci. Technol. B*, vol. 22, pp. 3405 ff (2004); L. Jiang et al., "Portable coordinate measuring tool," *J. Vac. Sci. Technol. B*, vol. 23, pp. 3056 ff (2005); M. Feldman et al., "Method of Patterning Two Patterns on a Single Transparent Substrate to Allow the Patterns to be Viewed Independently," U.S. provisional patent application 60/578, 577, filed Jun. 10, 2004; and D. L. White et al., "The interference fringe aligner," *J. Vac. Sci. & Technol. B*, vol. 6, pp. 1921-1924 (1988).

DISCLOSURE OF THE INVENTION

We have discovered an apparatus and method for imaging a diffraction grating with a very large depth of focus, using a highly accurate code plate position measurement system. Optical techniques are used to enhance the precision with which gratings are used as code plates, to accurately resolve high spatial frequencies with high contrast, with a large depth of focus, and very high precision. An interference fringe "representation" of the grating is formed a distance from the grating. This representation is imaged, for example with an optical microscope, onto a second grating that is positioned at a distance from the first grating. The first diffraction grating is illuminated on one side by one or more mutually coherent beams, preferably laser beams, so that a zero order beam and a first order beam emerge from the other side of the diffraction grating at equal and opposite angles. (Alternatively, a reflection grating might be used instead.) These beams interfere, forming a fringe pattern perpendicular to the grating, with the same period as the grating, and having a fixed phase with respect to the grating. By employing more than one incident beam, the fringes may be given very high contrast over a very large depth of focus centered a substantial distance from the grating. The fringes, or preferably an enlarged image of the fringes, is projected onto a second grating for comparison and measurement. In an optional, preferred embodiment, the projected image is magnified with a microscope onto the detection gratings to enhance the precision of measurements—making it possible to measure position to a precision of 1 nm or even sub-nanometer. The enlarged image of the fringes carries positional information for the grating, which may be used to determine the displacement of the grating. Magnifying the fringes simplifies detection of the signal, and the large depth of focus relaxes the requirements for focusing the image onto the detection grating.

In effect, the novel system uses light to average over many periods of the grating, thereby overcoming limitations of prior code plate systems, such as variations in line width, edge roughness, dirt, and short term variations in the period. Embodiments of the invention have been successfully constructed and tested, with nanometer and even subnanometer precision. Although code plates have usually been considered inferior in accuracy to interferometers, code plates possess strengths that are put to good advantage in the present invention. Code plates are relatively insensitive to changes in atmospheric pressure, humidity, and turbulence. The thermal coefficient of expansion may be chosen to match that of the workpiece, to minimize thermal effects.

MODES FOR CARRYING OUT THE INVENTION

Figure 1A:
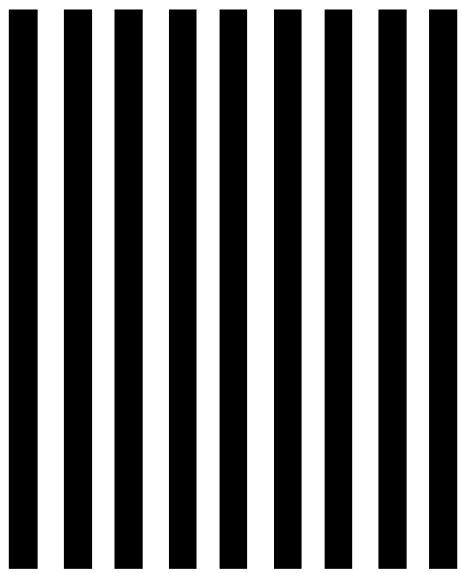
FIG. 1a depicts a "Ronchi" grating of equal clear and opaque lines.
Figure 1B:
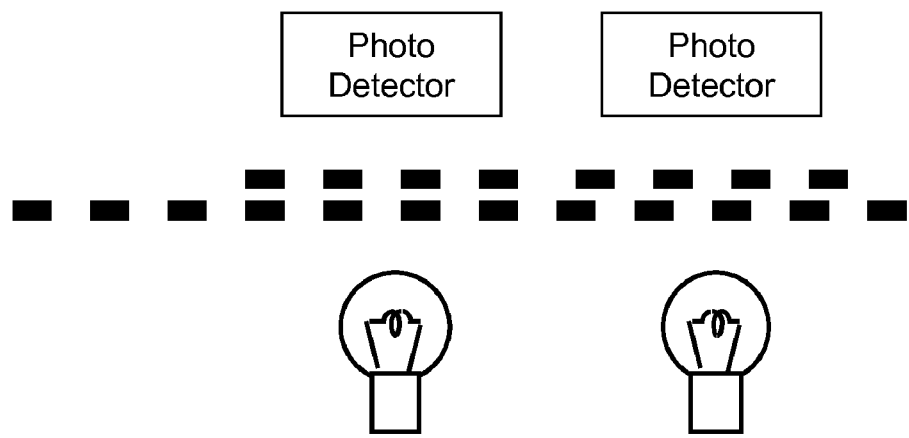
FIG. 1b depicts schematically light passing through a first Ronchi grating, and then through a pair of Ronchi gratings having the same period, onto a pair of photodetectors.
Figure 2:
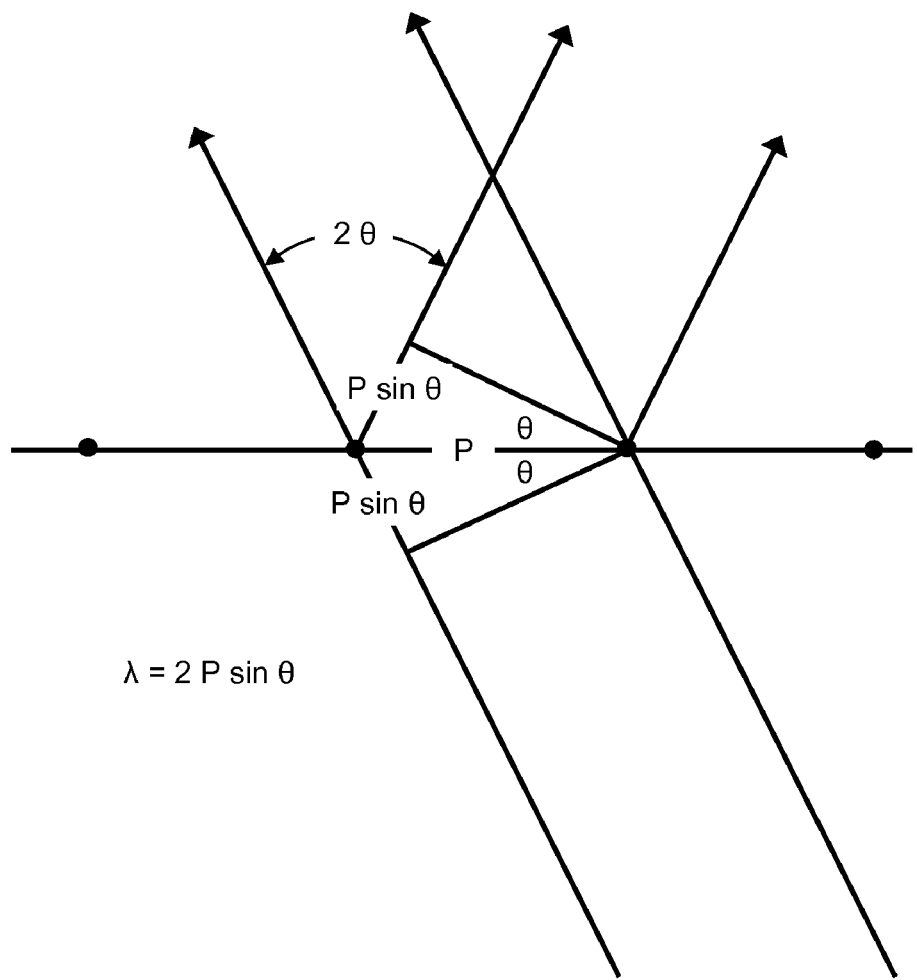
FIG. 2 depicts oblique illumination of a grating at the Littrow angle, and the resulting zero order and first order beams.
Figure 3A:
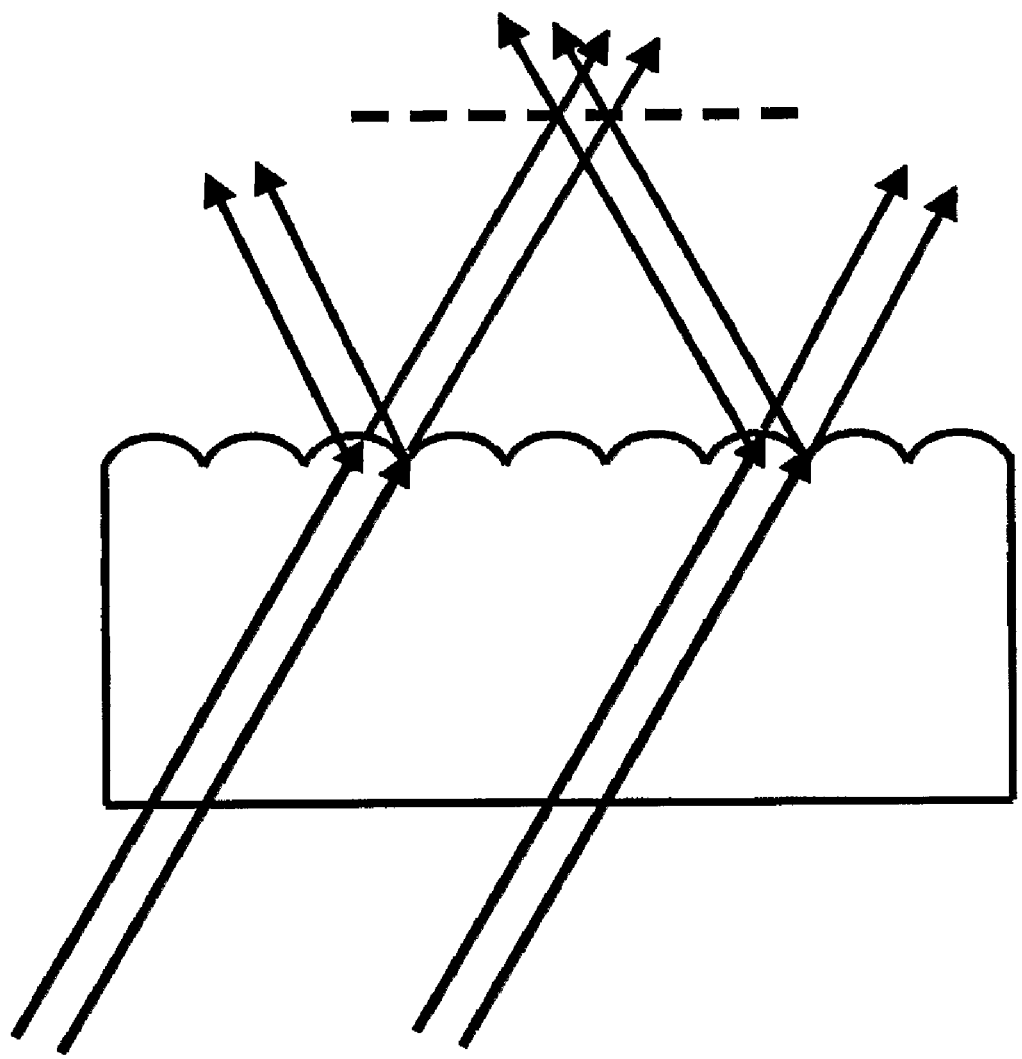
FIGS. 3a and 3b depict different representations of the interference of two parallel laser beams at a distance from the grating surface, to effectively form an image of the grating.
Figure 3B:

Two Beam Oblique Illumination. We have overcome the disadvantages of prior oblique illumination techniques by employing two parallel beams, for example spaced a few millimeters apart; and preferably having adjustable relative intensities. FIGS. 3a and 3b, for example, depict two representations of two parallel laser beams overlapping and interfering at a distance from the grating surface. The resulting interference fringes form a "representation" of the grating, a representation that is effectively an image of the regular, periodically repeating grating. However, the representation does not reproduce variations in line width, edge roughness, diffractive artifacts arising from dirt, and short term variations in the period. By overlapping the diffracted beams at a substantial distance from the grating, the energy generated by these departures from an ideal grating effectively dissipates. Consequently, the diffracted beams "heal" and become more nearly perfect plane waves, producing nearly perfect interference fringes. This situation is very different from single-beam oblique imaging techniques used in, e.g., integrated circuit lithography, where it is extremely important that the departures from ideal gratings be preserved. In the integrated circuit case the beams overlap at the grating, the depth of focus is very small, and the departures from ideal gratings, both wanted and unwanted, are preserved. The dashed line in FIG. 3a indicates the nominal image plane, but the depth of focus is comparable to the width of the incident laser beams, as may be seen in FIG. 3b. The width of the laser beam, and therefore the depth of focus, may, for example, be on the order of ~1 mm, which represents a very high depth of focus in comparison to many prior techniques. Higher diffractive orders are omitted from FIGS. 3a and b for clarity of illustration. The fringes form wherever the two coherent beams (one diffracted in the first order, the other in the zero order) overlap. The fringes form, in effect, a set of parallel, brightly illuminated plates, separated from one another by virtual dark plates. To assist in visualizing what occurs, consider what would happen If one placed a piece of paper or a screen into these fringes—or if one viewed them using a microscope objective having a small depth of focus. One would then see a series of bright lines, where the bright plates intersect the paper or the focal plane of the objective.

The two parallel, mutually coherent beams used in practicing the invention may be generated, for example, by multiple reflections within an optical flat, one side of which has both reflective and clear areas, and the other side of which is partly reflective. The beams strike different areas of the grating and, for example, first order diffracted light from one beam interferes with zero order light from the other beam. By matching the relative intensities of the beams to their respective diffraction efficiencies, the intensities of the interfering beams can be made nearly equal, and the resulting fringes will thus have high contrast, much higher than is obtained with prior oblique illumination techniques. Diffractive artifacts are also greatly reduced with this approach, because the region of overlap is far from the grating. The discrimination against diffractive artifacts using the present invention continues to improve with increasing distance from the grating. At large distances, changes in intensity due to diffractive artifacts fall off in approximately inverse proportion to the distance.

The transmitted zero and first order beams interfere to produce fringes above the grating. These fringes may be imaged, for example by a microscope objective. The fringes have a fixed position with respect to the grating. Such fringes occur wherever the beams overlap, giving the microscope a high effective depth of focus. Alternatively, the microscope may be viewed as redirecting the zero and first order beams so that they overlap at a much shallower angle, producing widely spaced fringes.

Although the beams interfere some distance from the grating, typically several millimeters away, the beams are locked into a fixed position relative to the grating. They are sensitive to translations of the grating along the code plate direction, but not to translations in either of the other two perpendicular directions (i.e., perpendicular to the code plate direction in the same plane, or normal to that plane). They are also relatively insensitive to rotations about any of the three axes. In addition, they retain the advantages of imaging small period gratings and an enormous depth of focus. The novel system is also relatively insensitive to motions of the two beams, so long as the angles of the beams do not change.

An additional advantage is that forming the fringes relatively far from the grating substantially reduces coherent artifacts, such as those arising from dust or imperfections in the grating. In one sense, the artifacts are far out of focus; in another sense the beams have a chance to "heal" and form plane waves after interacting with artifacts on the grating.

In another embodiment, two coherent beams that are not parallel to one another are incident upon a grating at angles such that the zero order of one beam and the first order of the second beam lie at equal and opposite angles to the normal to the grating. Fringes are then formed that lie in planes perpendicular to the grating, but that have a period different from that of the grating itself period. The period of the fringes may be chosen to be large compared to the period of the grating period. This approach effectively magnifies the image of the grating image. Movement of the grating by one period with respect to the light beams will move the fringe pattern by one period, regardless of the length of that period.

See FIGS. 5a and 5b of priority application 60/753,140 for examples, respectively, of high contrast fringe patterns that were formed of a grating using the novel technique, and of a white light image of the same grating. (These images are not included here, as they are not expected to reproduce well in the ordinary patent printing process.) The image that was formed with the two-beam, oblique illumination technique (with a HeNe laser), a 100× objective, and 6 mm of glass between the grating and the image plane clearly showed the structure of a 0.56 μm grating. A white light image of the same grating showed essentially no structure at all.

EXAMPLES AND EXPERIMENTAL RESULTS

Gratings having periods of 1.1 and 0.56 μm have been imaged using the novel technique. The gratings were imaged onto an NTSC format video camera with an Olympus microscope, and frames were "grabbed" for later analysis. The microscope had a 50× objective with an NA of 0.8, a 100× air objective with an NA of 0.9, and a 100× oil immersion objective with an NA of 1.30. Images were taken in white light, and in transmitted HeNe laser light at 0.6328 μm, using Talbot illumination, oblique illumination, and the novel two-beam oblique illumination. We successfully imaged the 0.56 μm period grating at the lowest NA used, 0.8, with both oblique and two-beam oblique illumination, even though the illuminating wavelength was longer than the period of the grating. See FIGS. 5a and 5b of priority application 60/753,140. Using Talbot imaging, multiple Talbot images were observed, contaminated by strong coherent artifacts. Strong coherent artifacts were also observed with single beam oblique illumination. Coherent artifacts were almost completely absent using the novel two-beam illumination system, under otherwise similar viewing conditions.

The particular 0.56 μm grating that we used in these prototype experiments had originally been manufactured for intended use as a reflection grating. It was not designed for use as a transmission grating. However, we removed an aluminum overcoat from the grating to use it in transmission instead. We found that the substrate underlying the aluminum was highly textured. The "de-coated" grating was barely visible in white light with the 100× air objective (FIG. 5b, priority application 60/753,140). Nevertheless, even in this extreme case, the two-beam oblique illumination produced satisfactory high contrast images (FIG. 5a, priority application 60/753,140).

We measured the verticality of the fringe pattern that was produced by a 1.1 μm grating under two-beam oblique illumination by defocusing the 100× objective ±100 microns, and observing the resulting shift in the video signal. Although we made no special effort to produce vertical fringes, the observed shift was only ±0.1 μm. This result indicated that the fringes were vertical to within 1 mrad; i.e., a change of focus of 1 μm corresponded to a shift of only 1 nm. It was a measure of the mechanical quality of the microscope we used that the image position remained stable over this range of focus. Apart from a change in intensity as the overlapping beams moved out of the field of view, no appreciable change was observed in the image formed by the fringes.

We measured the location of the imaged fringes within the video frame by averaging the video signal from all scan lines, and fitting the smoothed and normalized signal to a sine wave of fixed frequency. The phase of the best-fit sine wave was observed to vary by a few nm over locations within the video frame. This variation in the phase shift was qualitatively similar for the different microscope objectives tested, but it differed significantly in detail from one to the next. The small phase shift is thus believed to have arisen from optical distortion within the objective itself, or within other components of the microscope, and possibly also from distortion within the video camera or the grating itself.

We measured the accuracy of the location of the fringe pattern by dividing the data into 4 subsets, each containing every $4^{th}$ scan line. Because the observed distortions varied slowly over the video field, each subset provided an equivalent sample of the data. A sine wave was independently fit to each subset, and an optimal phase was determined. The standard deviation of these phases, expressed as a distance, was 0.18 nm. The standard deviation error of all the data, equivalent to averaging the 4 subsets together (i.e., averaging hundreds of thousands of data points), was only 0.09 nm.

In another prototype demonstration of the two-beam method, we have successfully and reproducibly counted the lines in a 1.1 micron grating, following back-and-forth motion over a range up to about 100 microns. We successfully and repeatedly were able to return to the same initial grating line. We simultaneously viewed the grating lines with a video camera, and captured numerous frames, unambiguously identifying the grating lines. We could locate the position of an individual line to within a very small fraction of the 1.1 micron period (on the order of 0.1 nanometer for the 1.1 micron grating. The position should be accurately measurable to much less than 0.1 nanometer with a 0.5 micron grating). In addition we have repeatedly and reproducibly traveled back and forth over known distances of 62 and 124 microns, and have digitally counted the grating lines without error, moving in both directions.

We have successfully used the novel two-beam oblique illumination technique to produce high contrast images of gratings, images that were free of coherent artifacts, and that had an enormous depth of focus. Gratings with periods smaller than the wavelength of the illuminating light have been imaged in air. The images traveled with the grating for movement along the code plate direction, but were insensitive to translations in the other two orthogonal directions, as well as to roll, pitch, and yaw of the grating.

Highly accurate gratings are available commercially that may be used for code plate measurements in accordance with the present invention to nanometer- or subnanometer-precision. The sensitivity of the novel two-beam oblique illumination technique to various types of motion is summarized below:

Translations

For motion along the code plate direction, we have achieved precisions of 0.1 nm (1 Å) with extensive computer processing of the data. In processing with a "fast" semiconductor chip, precisions of 1 nm should be routine.

For motion perpendicular to the grating plane (variable gap), assuming that the fringes are truly vertical, there should be essentially no significant effects observed within the region of the beam overlap. For example, the region of overlap is greater than 1 mm for laser beams that are themselves 1 mm in width.

For motion parallel to the grating lines, there should be essentially no significant effects observed, within the limits imposed by the length of the grating lines.

Rotations

For rotation about either axis in the plane of the grating, there may be second-order effects on the periods of the fringes. The second-order effects will be negligible for small rotations, and may be further minimized by limiting the number of fringes used.

Rotation about an axis normal to the grating can reduce the contrast of the image. The change in contrast may be minimized by making the beams narrow in the direction parallel to the grating lines.

Geophones and Other Low-Frequency and Very-Low-Frequency Acoustic Measuring Devices.

One area where high precision code plate measurements may be used to good advantage is in semiconductor manufacturing, where the novel technique provides a lower-cost, and in some cases more accurate alternative to the relatively expensive interferometric measurement methods that are now typically used.

Another area for which the novel technique is ideally suited is low-frequency and very-low-frequency acoustic measuring devices such as seismographs, geophones, and hydrophones. There is an unfilled need for sensitive, low-frequency and very-low-frequency acoustic measuring devices, for example, in geophones used for seismic exploration in potential oil- and gas-bearing formations. Two examples of uses in geophones are described below. The same principles will also apply to uses in other low-frequency (below ~10 Hz) and very-low-frequency (below ~1 Hz) acoustic measuring devices, such as seismographs and hydrophones.

Low frequency sound waves are less attenuated as they travel through the earth, and can therefore be used to explore geological formations to greater depths than is the case with higher frequencies. There are at least two significant limitations on the ability of current geophones to detect low-frequency and very-low-frequency sound waves:

1) The response of existing geophones is typically proportional to velocity. Therefore, response decreases linearly with frequency for a constant amplitude signal.

2) Existing geophones typically detect motion with respect to an inertial reference mass, which is held in a damped resonant structure. The resonant frequency of this structure is typically about 10 Hz, meaning that its response falls off rapidly at frequencies below about 10 Hz.

Both of these limitations are overcome, or ameliorated, using geophones based on the novel two-beam, oblique-illumination, code plate measurement technique.

By using a codeplate measuring system in accordance with the present invention, nanometer or even subnanometer displacements may be measured, with a response that is independent of frequency per se. While an inertial reference mass may still be used, the detection system per se exerts essentially zero force on the reference mass. In addition, the detection system is extremely tolerant to rotations, and to translations other than in the code plate direction. (Of course, simultaneous measurements may be taken in more than one direction if desired, simply by employing multiple code plate systems in accordance with the present invention, oriented in different directions.) Consequently, the suspensions or supports for the reference mass may have much smaller spring constants than would be feasible for prior geophones. In other words, because the detector need not be precisely located with respect to the reference mass, and because there need be no physical contact between them, the reference mass may be held by a very "soft" suspension, softer than has been feasible in prior geophones, affording sensitivity to much lower frequencies.

To illustrate the principle of the novel code plate geophones, consider a horizontal inertial reference mass as being essentially concentrated at the end of a simple pendulum. The mass will undergo little motion when the pendulum is driven above its resonant frequency. The displacement is measured as the relative motion between a code plate attached to the pendulum, and a detector linked to a fixed reference frame such as the Earth. The length of a simple pendulum is inversely proportional to the square of its resonance frequency.

Figure 4:
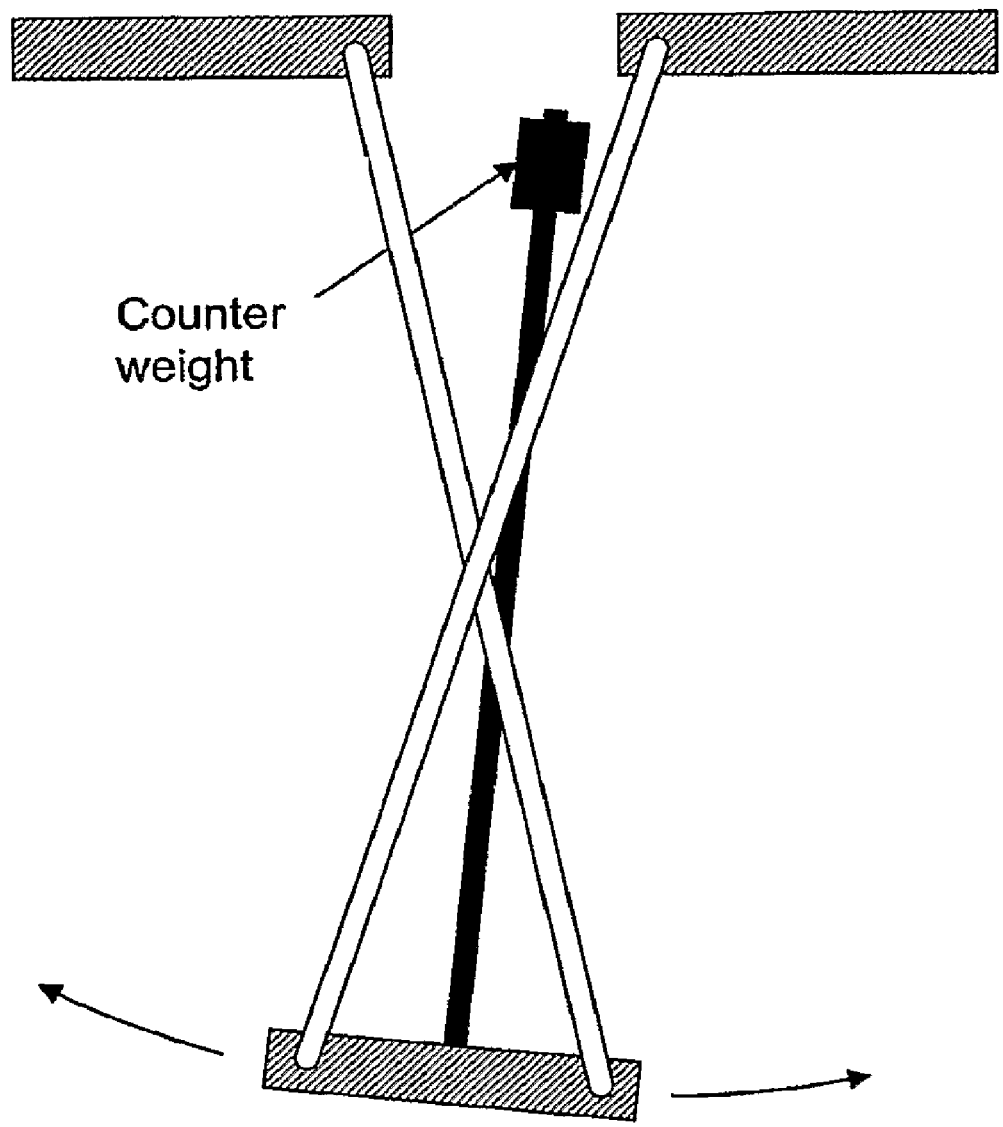
FIG. 4 depicts an inverted pendulum.

For frequencies below 1 Hz, a conventional pendulum is inconveniently long (over 25 cm). However, a more compact, inverted pendulum may be used instead, as illustrated in FIG. 4. The bottom plate is suspended by crossed lines or wires (four such lines are shown in the example of FIG. 4), so that as it swings in one direction, the counterweight on the top swings in the opposite direction. For example, we have built an inverted pendulum ~12 cm tall with a resonance frequency of 0.5 Hz. Even lower frequencies may be obtained with a taller or more precisely constructed inverted pendulum. It is preferred that the support plate shown in FIG. 4 should be as close to horizontal as possible, for which automatic leveling may be useful.

Figure 5:
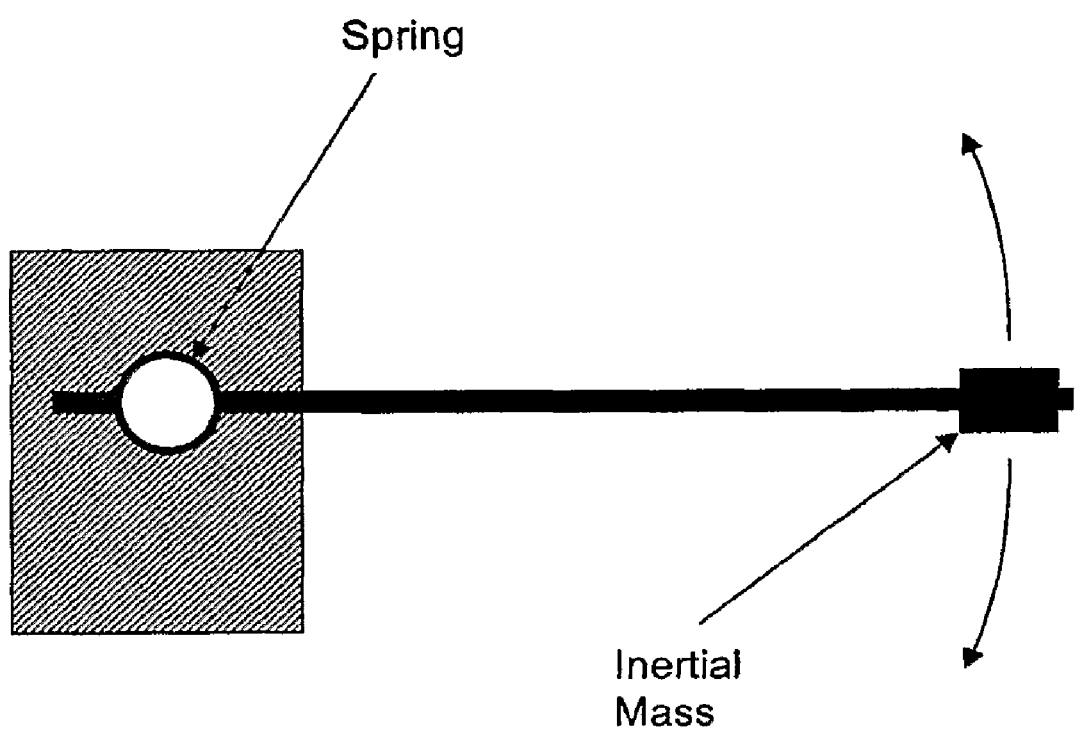
FIG. 5 depicts a coiled-spring oscillator.

Similarly, a concentrated mass at the end of a spring (or in the middle of a pair of springs, and attached to both) may be used to provide a vertical inertial reference mass. The relative motion between a code plate attached to the weight and a detector linked to the earth then provides a vertical displacement signal. The vertical displacement through which the spring is stretched is inversely proportional to the square of its resonance frequency. For frequencies below 1 Hz, a linear spring is inconveniently long (over 25 cm). However, a coiled spring may be used to provide torque in a more compact construction for use in low-frequency and very-low-frequency displacements, as illustrated in FIG. 5. For example, we have built a coiled-spring device with an arm ~12 cm long and a resonance frequency of 0.5 Hz. Torque for low-frequency and very-low-frequency oscillations may be generated by applying many turns to a relatively weak spring. In a preferred embodiment, an automatic control mechanism is used to adjust and maintain the desired torque. Note that as used in the specification and claims, unless otherwise indicated by context, the term "spring" should be understood to encompass not only traditional helical and coiled springs, tension and compression springs, but also other devices that have analogous mechanical properties, such as leaf springs, torsion springs, spiral springs, cantilever springs, gas springs, magnetic suspensions, magnetic levitation systems, elastic bands, and the like.

Unless otherwise clearly indicated by context, "diffracted" light refers to zero order diffracted light, plus or minus first order diffracted light, plus or minus second order diffracted light, and so forth. Two diffracted light beams have "different orders" if either the magnitude or the sign of their respective orders of diffraction are different. Thus, for example, zero order and (plus or minus) first order diffracted light are of different orders. (Plus or minus) first order and (plus or minus) second order are of different orders. A +1 order diffracted beam and a −1 order diffracted beam are of different orders. A +2 order diffracted beam and a −2 order diffracted beam are of different orders. However, two zero order beams are of the same order. Two +1 order diffracted beams are of the same order. Two −2 order diffracted beams are of the same order. And so forth.

Miscellaneous

The embodiments described above are those that are currently preferred. However, there are various changes that those of skill in the art can make in alternative embodiments, without departing from the spirit of the invention. For example, the grating may be reflective rather than transparent. The two beams need not necessarily be laser beams, so long as they are mutually coherent, or nearly so. The two beams need not necessarily be parallel. The fringe pattern need not have the same period as the grating, and it will move whenever the grating moves. Instead of moving the grating, one of the beams may be attached to a movable platform, while the other is fixed relative to the grating. Other variations will occur to those of skill in the art.

The complete disclosures of all references cited in this specification, including the complete disclosures of both priority applications, are hereby incorporated by reference. In the event of an otherwise irreconcilable conflict, however, the present specification shall control.

What is claimed:

1. A method for precisely measuring changes in the displacement of a first object relative to a second object, along a selected direction to be referred to as the x-direction; wherein the first object is rigidly affixed to an optical grating whose lines extend in a direction, to be referred to as the y-direction, that is different from the x-direction; wherein the second object is rigidly affixed to a measurement grating that is parallel to the optical grating, and whose lines also extend in the y-direction; said method comprising the steps of:

(a) illuminating the optical grating with two mutually coherent or nearly coherent beams of light; such that zero order light from the first beam and plus or minus first order diffracted light from the second beam intersect at a non-zero fixed angle relative to one another; so that diffracted light from the first beam overlaps and interferes with diffracted light from the second beam to generate interference fringes extending in the y-direction, wherein the positions of the interference fringes in the x-direction correlate with the positions of the lines in the optical grating in the x-direction; and wherein the intensities of the two beams are such that the intensity of the interfering diffracted light from the first beam is approximately the same as the intensity of the interfering diffracted light from the second beam; whereby the interference fringes effectively form an image of the optical grating with a large depth of focus along the direction of the interference fringes;

(b) observing any changes in the position of the interference fringes relative to the measurement grating, as a measure of any changes in the position of the first object relative to the second object along the x-direction;

whereby:

(c) the observed position of the interference fringes relative to the measurement grating is highly sensitive to small translations of the two objects relative to one another along the x-direction, but is relatively insensitive to small translations along the y-direction.

2. A method as recited in claim 1, wherein both light beams have a fixed position relative to the optical grating; or wherein both light beams have a fixed position relative to the measurement grating.

3. A method as recited in claim 1, additionally comprising the step of projecting an image of the interference fringes onto the measurement grating.

4. A method as recited in claim 1, wherein the optical grating is a transmission grating, and wherein said illuminating step comprises illuminating the optical grating in transmission.

5. A method as recited in claim 1, wherein the optical grating is a reflection grating, and wherein said illuminating step comprises illuminating the optical grating in reflection.

6. A method as recited in claim 1, wherein both light beams are mutually coherent laser beams.

7. A method as recited in claim 1, wherein the overlapping light from the first and second beams lie near but not in the same direction, so that 2 or more interference fringes are formed, and so that the period of the interfering fringes is substantially larger than the period of the optical grating.

8. A method as recited in claim 1, wherein the direction that is normal to the x,y-plane of the optical grating will be referred to as the z-direction; wherein the interfering diffracted beams are at equal and opposite angles to the z-direction; whereby the interference fringes effectively form an image of the optical grating with a large depth of focus along the z-direction; and whereby the observed position of the interference fringes is relatively insensitive to small translations of either object along the z-direction, and is relatively insensitive to small rotations of either object about any axis.

9. A method as recited in claim 8, wherein the y-direction and the x-direction are perpendicular.

10. A method as recited in claim 8, wherein zero order light from the first beam and plus or minus first order diffracted light from the second beam are at equal and opposite angles to the z direction.

11. A method as recited in claim 8, wherein the first and second beams of light are parallel to each other and incident on the optical grating at the Littrow angle.

12. A method as recited in claim 1, wherein said method is used for sensitively measuring low-frequency or very-low-frequency acoustic waves; wherein:

(a) the position of one of the objects is fixed relative to the medium through which the acoustic waves travel, and the position of the other object is fixed relative to a reference mass;

(b) the reference mass is attached to a pendulum or to a spring; wherein the resonance frequency of the pendulum or spring with the attached reference mass is about 10 Hz or lower;

(c) any changes that are observed in the position of the interference fringes relative to the measurement grating correspond to acoustic waves of about 10 Hz or lower that impinge on the object that is fixed relative to the acoustic medium.

13. A method as recited in claim 12, wherein the medium through which the acoustic waves travel is the earth.

14. A method as recited in claim 12, wherein the medium through which the acoustic waves travel is a body of water.

15. Apparatus for precisely measuring changes in the displacement of a first object relative to a second object, along a selected direction to be referred to as the x-direction; wherein said apparatus comprises:

(a) an optical grating adapted to be rigidly affixed to the first object, wherein said optical grating comprises lines that extend in a direction, to be referred to as the y-direction, that is different from the x-direction;

(b) a measurement grating adapted to be rigidly affixed to the second object, wherein the measurement grating is parallel to the optical grating, and wherein the measurement grating comprises lines that also extend in the y-direction;

(c) a light source or light sources adapted to illuminate the optical grating with two mutually coherent or nearly coherent beams of light; such that zero order light from the first beam and plus or minus first order diffracted light from the second beam intersect at a non-zero fixed angle relative to one another; so that diffracted light from the first beam overlaps and interferes with diffracted light from the second beam to generate interference fringes extending in the y-direction, wherein the positions of the interference fringes in the x-direction correlate with the positions of the lines in said optical grating in the x-direction; and wherein the intensities of the two beams are such that the intensity of the interfering diffracted light from the first beam is approximately the same as the intensity of the interfering diffracted light from the second beam; whereby the interference fringes effectively form an image of said optical grating with a large depth of focus along the direction of the interference fringes;

(d) an optical system to observe any changes in the position of the interference fringes relative to said measurement grating, as a measure of any changes in the position of the first object relative to the second object along the x-direction;

whereby:

(e) the observed position of the interference fringes relative to said measurement grating is highly sensitive to small translations of the two objects relative to one another along the x-direction, but is relatively insensitive to small translations along the y-direction.

16. Apparatus as recited in claim 15, wherein said light source or light sources are adapted to generate both light beams having a fixed position relative to said optical grating; or having a fixed position relative to said measurement grating.

17. Apparatus as recited in claim 15, additionally comprising an optical system adapted to project an image of the interference fringes onto said measurement grating.

18. Apparatus as recited in claim 15, wherein said optical grating is a transmission grating.

19. Apparatus as recited in claim 15, wherein said optical grating is a reflection grating.

20. Apparatus as recited in claim 15, wherein said light source or light sources comprise a laser.

21. Apparatus as recited in claim 15, wherein the direction that is normal to the x,y-plane of said optical grating will be referred to as the z-direction; wherein the interference fringes effectively form an image of said optical grating with a large depth of focus along the z-direction; and whereby the observed position of the interference fringes is relatively insensitive to small translations of either object along the z-direction, and is relatively insensitive to small rotations of either object about any axis.

22. Apparatus as recited in claim 21, wherein the y-direction and the x-direction are perpendicular.

23. Apparatus as recited in claim 15, wherein said apparatus is adapted to sensitively measure low-frequency or very-low-frequency acoustic waves; additionally comprising a reference mass, and a pendulum or spring, wherein:

(a) the position of one of the objects is fixed relative to a medium through which the acoustic waves travel, and the position of the other object is fixed relative to said reference mass;

(b) said reference mass is attached to said pendulum or to a spring; wherein the resonance frequency of said pendulum or spring with said attached reference mass is about 10 Hz or lower;

(c) any changes that are observed in the position of the interference fringes relative to said measurement grating correspond to acoustic waves of about 10 Hz or lower that impinge on the object that is fixed relative to the acoustic medium.

\* \* \* \* \*